United States Patent [19]

Lester

[11] 4,297,022

[45] Oct. 27, 1981

[54] LIGHT PIPE VALVE LIQUID CRYSTAL TRANSMISSIVE DISPLAY FOR DIRECT IMAGING ON PHOTOSENSITIVE MATERIALS

[75] Inventor: Robert W. Lester, Manhasset, N.Y.

[73] Assignee: Static Systems Corporation, New York, N.Y.

[21] Appl. No.: 99,685

[22] Filed: Dec. 3, 1979

[51] Int. Cl.³ .......................................... G03G 15/00
[52] U.S. Cl. .................................... 355/3 R; 156/109; 350/331 R; 350/334; 355/1; 355/77
[58] Field of Search ............... 355/3 R, 1, 5, 40, 77; 354/5; 346/160; 340/380; 358/901; 350/330, 331 R, 334; 156/109; 428/1; 101/DIG. 13

[56] References Cited

U.S. PATENT DOCUMENTS

| | | | |
|---|---|---|---|
| 3,824,604 | 7/1974 | Stein | 354/5 |
| 4,110,794 | 8/1978 | Lester et al. | 354/5 X |
| 4,183,630 | 1/1980 | Funada et al. | 350/334 |
| 4,194,833 | 3/1980 | Lester et al. | 354/5 X |

*Primary Examiner*—Richard L. Moses
*Attorney, Agent, or Firm*—Allison C. Collard; Thomas M. Galgano

[57] ABSTRACT

A liquid crystal light pipe display for direct imaging onto photosensitive materials, having a non-conductive, transparent first sheet and a non-conductive substantially opaque second sheet, each having substantially planar inner and outer surfaces. The non-conductive sheets are disposed adjacent to one another with their inner surfaces opposing one another in spaced-apart relationship separated by a sealed-in, normally transparent, liquid crystal material. The non-conductive sheets each have a transparent conductive electrical coating disposed on their inner surface, of a plurality of discrete character forming segments with means connected thereto for electrically coupling said segments to an external power source. The second non-conductive sheet has a plurality of discrete transparent light pipes formed therethrough, each of which are aligned with one of said character forming segments. First and second linear polarizer sheets are secured to the outer surface of said first non-conductive sheet and to the outer surface of the second non-conductive sheet.

When the adjacent character forming segments are actuated by the power source, light from an external light source is transmitted through the liquid crystal element and through each of the corresponding light pipes for direct imaging onto photosensitive materials. The display may be a single row of dots capable of scrolling images onto the moving photosensitive drum of a photocopy machine, or a full screen of rows and columns of dot matrices for creating a full display of images onto planar photosensitive materials.

21 Claims, 11 Drawing Figures

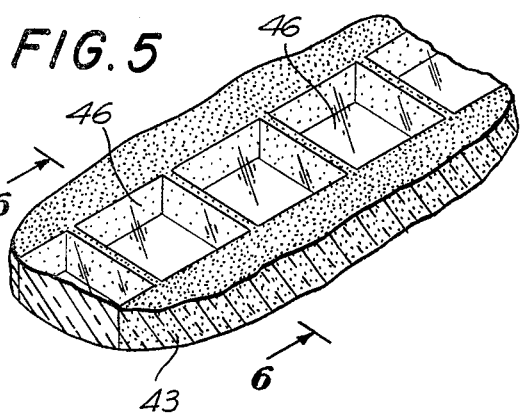
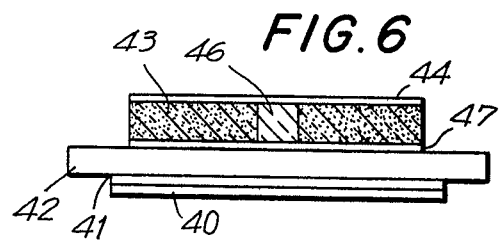
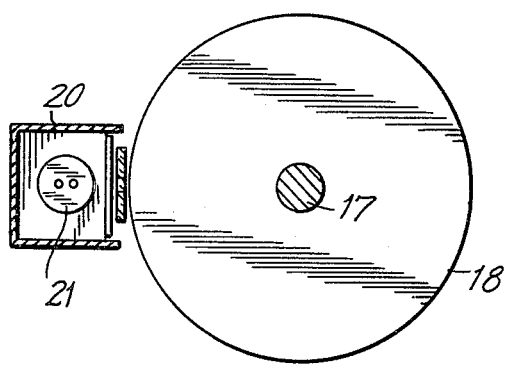
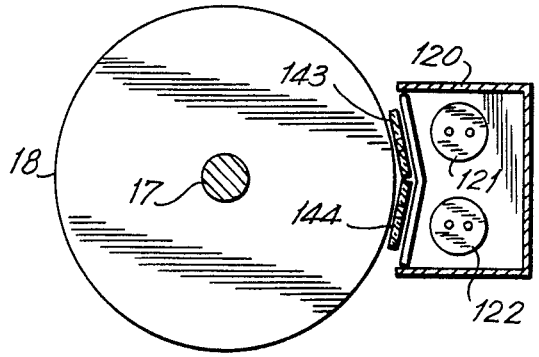
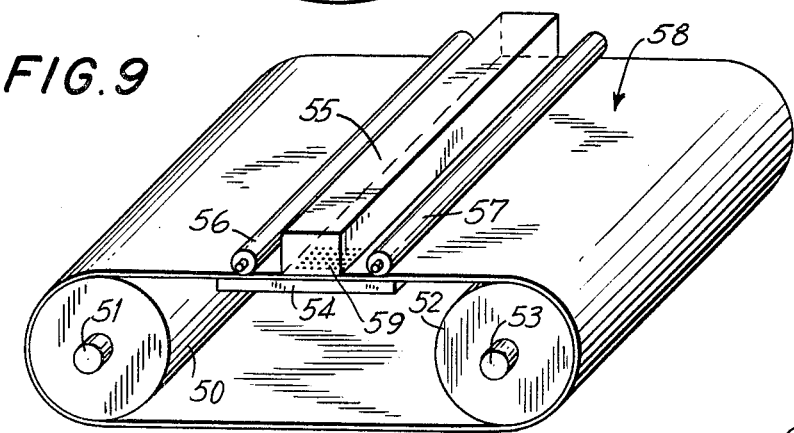
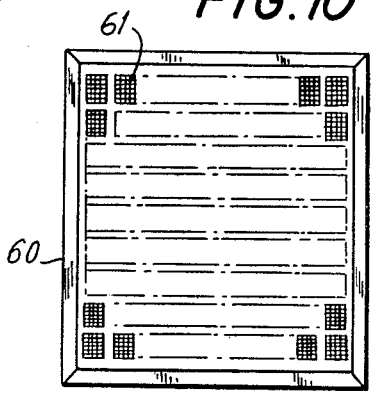
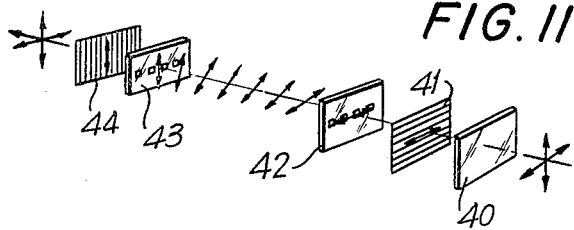

LIGHT PIPE VALVE LIQUID CRYSTAL TRANSMISSIVE DISPLAY FOR DIRECT IMAGING ON PHOTOSENSITIVE MATERIALS

This invention relates to an electronic solid state printer using a liquid crystal display direct imaging strip in cooperation with a copy machine to produce a finished copy.

More specifically, this invention relates to an electronic printer which uses a liquid crystal transmissive display strip wit light pipe valves for direct imaging on a copy machine, whereby the liquid crystal light pipe strip is scrolled in synchronism with the sweep of the copy machine to produce a printed copy.

Word processing machines, such as typewriters with stored memories first became available to the public during the middle 1960's. IBM Corporation developed the MTST Model having a single or dual tape drive, which was capable of receiving programmed information from a typewriter and allowing corrections to be made to the program before the final copy was typed. A number of other manufacturers, such as Remington, Redactron, Sabin, as well as IBM, also began producing magnetic card typewriters having single and dual card capability. The typed information was stored on one or more magnetic cards, and could be recalled by inserting the card into a card reader at any time. Suitable corrections could be made to the text of the card, so that the machines removed the necessity of expensive proof reading of the final material, once minor corrections were made to the original copy. More sophisticated word processing machines have also been developed, using a full-page CRT (cathode ray tube) display, such as the Vydec apparatus. This allows a full video display of the typed information before it is transcribed on paper.

There is also a Xerox 1200 Model, which consists of a binary-information-fed or serially-fed photocopy machine which, however, employs many moving parts, including a character-generating drum moving at high speed inside the selenium reproduction drum. The character drum works in combination with a photo-optical generator for reproducing the images on the reverse side of the selenium drum, so that they can be printed after suitable dusting and heat. The images produced by this Xerox method are blurred, and this differs from the present invention, which does not have any moving parts or any noise, since it is entirely electronic in its character generation.

Almost all of the above machines require the use of a mechanical printing device for transcribing the recorded information on to a printed page. Some of the word processing devices use a heavy duty IBM Selectric typewriter, whereas, others use a high speed daisy wheel printer capable of printing approximately 500 words per minute. Newer printers are now available using an ink spray deposit method in an attempt to improve the speed of the printout. However, where a large number of pages have to be reproduced from stored information, the operator of the word processing machine remains idle for long periods of time until the mechanical printing device can complete the transfer of the information from a memory disc or tape to the printed page.

The conventional word processing machines also suffer from the disadvantage that the mechanical printers are subject to breakdown and require frequent repairs or adjustments during a heavy duty operation. The mechanical printing portion of the word processing machines also represents a substantial cost of the word processor, so that the price to purchase some of the conventional word processors runs between $10,000 to $18,000. Moreover, the average cost of typewriter ribbons for each mechanical printer runs between $200.00 to $500.00 per year, an expense that is eliminated by the present invention.

There have also been proposed various other prior art devices for printing using liquid crystal elements which employ complex and expensive machinery. Such devices are described in U.S. Pat. Nos. 3,824,604, 3,610,730, 3,982,831, and 4,080,058.

In my earlier co-pending application U.S. Pat. No. 794,787, filed May 9, 1977, entitled "Electronic Typewriter Having an Electronic Display", now U.S. Pat. No. 4,194,833 an electronic typewriter having a LCD strip was disclosed, wherein the row of dots forming the images, were projected by mirrors onto the photo-sensitive design by reflected light. The earlier application uses the same scrolling techniques and electronic circuitry as the present application. However, by using the direct imaging of the LCD strip onto the drums, as in the present invention, there is an improved clarity and sharpness of the character images when printed by the photo-sensitive drum.

Accordingly, the present invention provides an electronic printer which can be electrically coupled to a computer or typewriter output, and has liquid crystal light pipe display (LCD). The display consists of a transmissive liquid crystal light pipe glass material sandwiched to a light pipe valve that is disposed adjacent to the drum of a standard copy machine, such as a plain paper copier, for reproducing alphanumeric characters, which are illuminated from the rear by a sealed leak-proof light box. In the invention, an electronic keyboard of a typewriter or a computer program is used to prepare a letter or report. The alphanumeric letters, which are produced, are also displayed on a screen either adjacent to or mounted on the typewriter or computer, so that suitable corrections and additions can be made to the text before it is finalized. After the text is in final form, a print button on the typewriter or computer is depressed and the complete text is scrolled line-by-line across the LCD screen, and viewed by the the copier drum.

In the present invention, the imaging of characters onto a photosensitive surface is performed without lenses or mirrors. The liquid crystal display is light transmissive and is placed in almost direct contact with the photosensitive surface. Since the LCD is disposed inside a double layer of glass with polarizers on the top and bottom, the LC crystals which form the images would be out of focus, and bloom out the image when illuminated from the rear portion. According to the invention, the glass layer adjacent to the photosensitive surface consists of a light pipe valve formed of a sheet of opaque material, such as glass, having one or more rows of clear apertures. A conductive electrical etching is formed covering each light pipe so as to block out any light leakage to the adjacent aperture when the liquid crystal is energized. The apertures thus act as camera shutters to block out the transmissive light source from reaching the photoconductive surface when the LC turns opaque. When the light pipe valve is placed very close or in direct contact with the photosensitive surface, the images formed by the "open" apertures of the light pipe valve are in sharp focus, with little or no image blooming.

In one embodiment, the LCD strip preferably has a single row of dots, and is coupled by a peripheral interface adapter, to a memory, such as a RAM, and to a microprocessor. By strobing each electrode connected to the row of dots of the LCD screen, an image is formed on the LCD display. In order to produce a clear image on a xerographic type copy machine where a selenium drum is used to record the image as the drum rotates, the original text has to be scrolled at a rate that is synchronous with the rotation of the drum. As the drum rotates, it must record a different part of the image on each part of its surface. In the present invention, the original document consists of an LCD strip with a light pipe valve panel, which is held stationary adjacent to the photo-sensitive selenium drum. In order to recreate the original copy from the LCD strip, a technique is used called "upshift character line mode". This is basically a modified scrolling of the character line on the LCD screen. On the LCD screen, the top portion of a complete line of alphanumeric characters are produced as a row of dots on the LCD strip. In the next time interval, this top portion is shifted one space up, and the LC row of dots on the strip will contain the adjacent lower part of the character line. As the processor continues its cycle, the entire character will be formed by the row of dots, and the bottom portion of the character will eventually be shifted off the display in a subsequent time interval. This process is accomplished by the technique of addressing the row of dots, then in the next time interval, addressing these same row dots and adding the lower adjacent part of the character line by addressing the previous row with the proper dots. This, in effect, shifts the dots up one space, and adds to the single row of dots of the line, the next lower portion of the character. To the copy machine, this creates the illusion of an upward ascending copy in which one is viewing just a part of the line as a row of dots through a narrow slit placed over the copy.

It is therefore an object according to the present invention to provide an electronic solid state printer using a liquid crystal light pipe display strip, which is capable of directly imaging alphanumeric indicia onto a photocopy machine.

It is another object according to the present invention to provide electronic solid state printer with a liquid crystal display strip, which is simple in design, easy to construct amd reliable in operation.

Other objects and features of the present invention will become apparent from the following detailed description considered in connection with the accompanying drawings, which disclose the embodiments of the invention. It is to be understood, however, that the drawings are designed for the purpose of illustration only, and not as a definition of the limits of the invention.

In the drawings, wherein similar reference characters denote similar elements through the several views:

FIG. 5 is a detailed view, partly in cross-section, of the light pipe valve element used in the present invention;

FIG. 6 is a cross-sectional view taken through section 6—6 of FIG. 5 of the LCD strip combined with the light pipe valve element, according to the invention;

FIG. 7 is an end view, partly in cross-section, of the LCD strip with the light pipe element coupled to the drum of a photocopy machine;

FIG. 8 is another embodiment using a pair of LCD strips for direct imaging onto the drum of a photocopy machine;

FIG. 9 is a further embodiment of the invention, showing the use of the LCD light pipe element with flat, belt-type photocopy machines;

FIG. 10 is a rectangular panel using an LCD matrix in combination with light pipe elements for forming direct images onto flat, photosensitive surface; and FIG. 11 is an exploded view, showing the optics of the LCD strip with the light pipe valve element.

Figure 1:
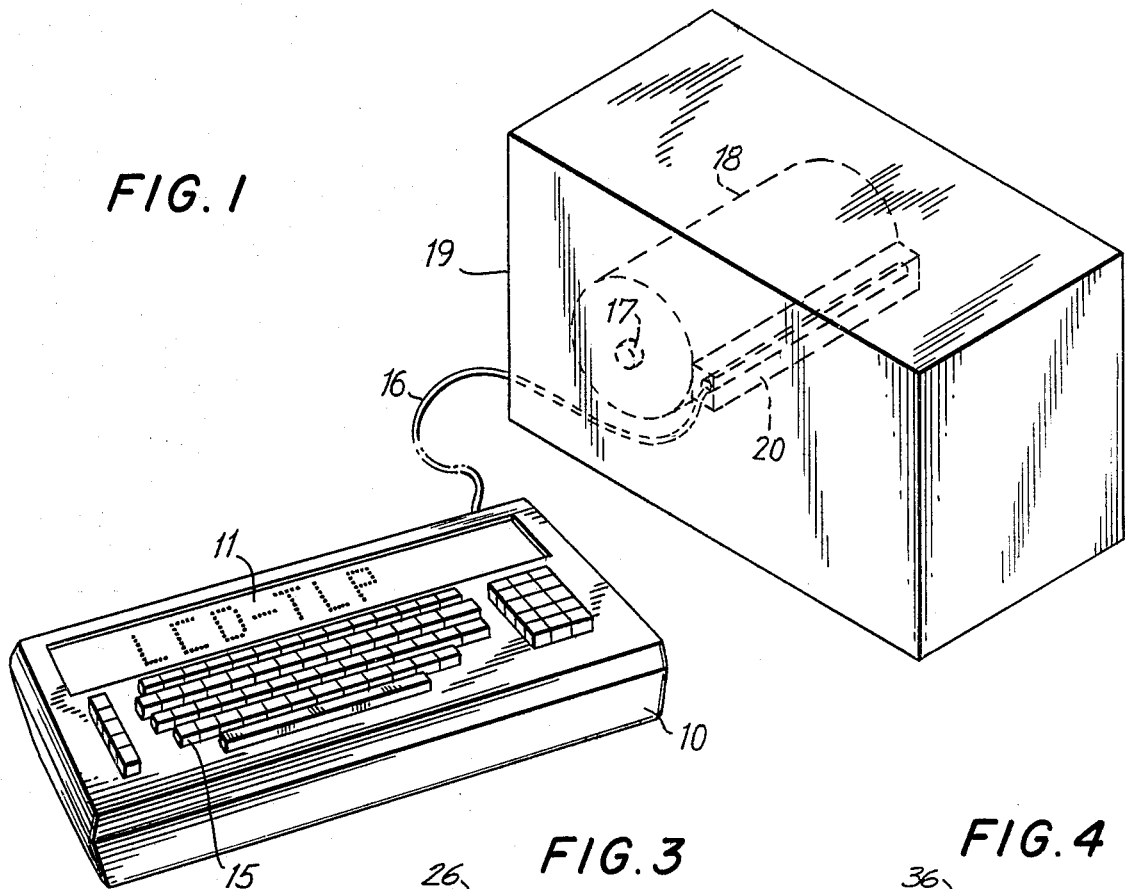
FIG. 1 is a perspective view showing the solid state printer having a typewriter keyboard electrically coupled to a liquid crystal display (LCD) strip mounted in a copy machine adjacent to the photo-sensitive drum, according to the invention.

Referring to FIG. 1, there is shown an electronic keyboard 10, having a plurality of alphanumeric keys 15, and including an LCD display screen 11, mounted adjacent to keys 15. Screen 11 may be capable of producing several lines of character text, so that the operator can make corrections to the text as it is being produced. Keyboard 10 includes an electrical connection 16 to a photocopy machine 19, such as a xerographic copier, which includes a photo-sensitive drum 18, such as a selenium drum mounted on an axis 17, within the machine. Optically coupled to the surface of the drum is an LCD strip 20, including a light pipe valve element.

In FIG. 1, one of keys 15 is a "print" button, which will allow the operator to activate photocopy machine 19, in order to make a print of the images appearing on strip 20. In place of keyboard 10, conductor 16 could also be connected to the output of a computer or modem.

The alphanumeric keyboard 10 includes a solid state memory circuit, for storing and spacing into its memory the alpha-numeric characters which are selected by the operator. There is also provided in the keyboard a microprocessor circuit having a algorhythm circuit, and coupled to the memory circuit, for converting the stored alpha-numeric characters from the memory to a line of dots, by comparison with the algorhythm, so that the dots can be reproduced on the LCD display strip. The LCD strip is disposed parallel to axis 17 of photosensitive drum 18. Since the strip is coupled to the microprocessor within keyboard 10, the microprocessor addresses the proper column of dots in a row, to produce the top portion of a complete line of alphanumeric characters on the screen. The microprocessor then addresses the same row of dots in the next sequential row, so that the top portion of the characters are shifted one space upwardly, to display the adjacent lower portion of the character line on the screen. After a plurality of addressing cycles, the stored alphanumeric indicia are reproduced on the screen, and are scrolled synchronously in the same direction and at the same speed as the speed of the drum 18. It is not necessary to mechanically or electrically couple the photocopy machine to the scrolling speed of the microprocessor, since an exact synchronization is not really required, as long as the surface speed of the drum is approximately the same speed as the scrolling speed of the dots controlled by the microprocessor.

Figure 2:
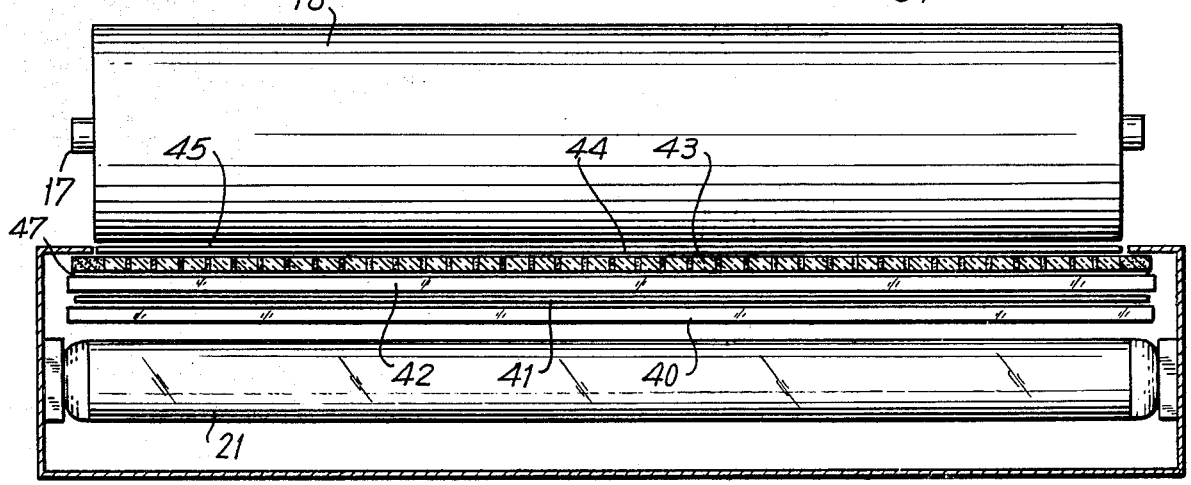
FIG. 2 is a detailed view, partly in cross-section, of the liquid crystal and light pipe valve element, used for direct imaging onto the photo-sensitive drum, according to the invention.

FIG. 2 is a detailed view, partly in cross-section, showing the photocopy drum in close proximity to the LCD element 20. Within the housing of the element is contained a light source 21, which may be a fluorescent tube or could be a xenon strobe flash tube. The LCD strip consists basically of a first glass panel 40, a polarizer screen 41 and a second clear glass panel 42. A light pipe valve glass panel 43, which is generally opaque except for a plurality of light pipe openings which are preferably spaced apart across its surface. Disposed over each light pipe opening is a conductive electrical coating in the form of a dot or square. A similar conductive electrical coating in the form of a dot or square is disposed on the adjacent inside surface of glass panel 42. Both dot or square coatings are transparent.

Figure 3:
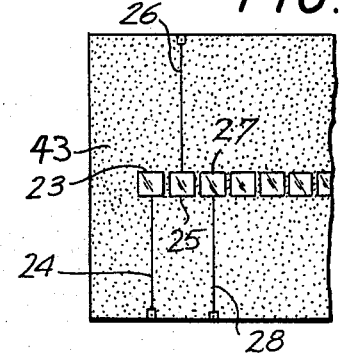
FIG. 3 is a detailed view of one embodiment of the LCD conductive electrical etching on a panel, using a single row of dots.

A detailed view of the transparent conductive regions of dots or squares are shown in FIG. 3. The conductive regions are formed on the adjacent surfaces of light pipe 43 and clear glass panel 42. In FIG. 3, a row of conductive electrical dots 23, 25, 27, etc., are etched and have corresponding electrical connections 24, 26 and 28. The connections are shown in black for illustration only, but are normally transparent. The dots are preferably 0.050" in width or diameter and separated from one another by 0.001" for independent electrical operation.

Figure 4:
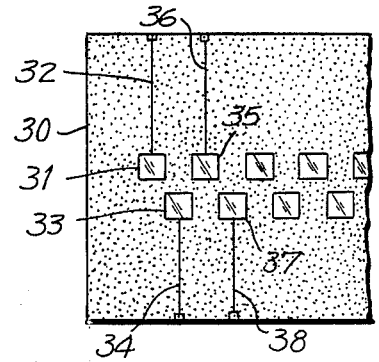
FIG. 4 is another embodiment of an LCD etched panel, using staggered row of dots for image forming, according to the invention.

In another embodiment of the invention as shown in FIG. 4, two rows of staggered, etched conductive dots 31, 35 and 33 and 37 are provided with their corresponding electrical connections 32, 34, 36 and 38, for producing character images. Conductive dot 33 is made at least as wide as the space between dot 31 and 35, so that part of the image of a character can be formed using dots 31 and 35, while the remaining portion of the character can be formed using dots 33 and 37, without any spacing or segmentation showing up between the dots. In the formation of a character, dots 31 and 35 and any other dots in that same row, are initially activated, to form latent dot images on the photosensitive surface of the drum. As drum 18 rotates, dots 31 and 35 are extinguished and dots 33 and 37 and others in that row are subsequently activated. The latent images created by dots 31 and 35, are thus advanced by the drum, into a position that is aligned with dots 33 and 37. The activation of dots 33 and 37 create latent images that fill in completely between the spaces of the latent images created by dots 31 and 35 and corresponding dots of that row. Thus, a solid line can be created without any visible segmentation between adjacent dots.

FIG. 5 is an enlarged cross-sectional view of the light pipe valve glass panel 43 of the subject invention, which preferably consists of a planar sheet of opaque glass having a row of clear glass "light pipes" 46, which may either be circular or square (as shown), and formed in a straight line, adjacent to each other. Each of the circular or square light pipes 46 have a corresponding transparent conductive electric dot etched on its surface so as to completely cover or mask the light pipe in a manner described with respect to FIG. 3. Each LCD etched dot is sufficiently large so as to completely close off each light pipe 46, from the passage of transmissive light when the liquid crystal element is activated.

Referring back to FIG. 2, the drum is shown spaced from the LCD strip 20 approximately 0.001-0.002". Between the drum and light pipe panel 43 is a very thin polarizing screen 44, preferably having a thickness of 0.0001-0.0002". Due to the close proximity of the photo-sensitive drum 18 to the surface of the light pipe panel 43 and polarizer, it is possible to have direct imaging of each of the light pipes onto the surface of the drum, with substantially little blooming of the image.

In operation, light source 21 of FIG. 2 is illuminated and provides illumination through glass panel 40 and through polarizer 41, so that polarized light will pass through clear glass panel 42 to the liquid crystal 47. Depending upon the electrical signal provided through the conductive dots etched on the panels, the dots will be either be clear or opaque, so that light will either be blocked off or transmitted through each of windows of light pipe valves of the light pipe glass panel, and through its corresponding polarized screen 44 onto the surface of the photocopy drum 18.

FIG. 6 is an enlarged end view of the light pipe LCD elongated element, showing clear glass panel 40, polarized sheet 41, a second clear glass 42, and light pipe element 43 sandwiched to clear glass element 42, and containing the liquid crystal fluid 47. The top polarizer 44 is shown covering each of the light pipe openings 46 in the system.

FIG. 7 is an end view, showing drum 18 mounted on axis 17 in close proximity to the LCD element on strip 20, illuminated by lamp 21.

In FIG. 8, two light pipe LCD elements 143 and 144 are used, each illuminated by lamps 121 and 122 in housing 120. Element 143 contains a first staggered row of dots, such as the top row of dots 31, 35, etc., shown in the element 30 of FIG. 4. LCD element 144 contains a second row of dots, which are offset or staggered with respect to the dots and light pipes of element 143. In a manner similar to the device of FIG. 4, the activation of both LCD screens 143 and 144 form a complete line of dots without segmentation. The dots of strip 144 are sufficiently wide to fill in the spaces between dots 143, so that the images can be reproduced without any segmentation. If drum 18 is rotated clockwise, the row of dots in strip 143 would be activated first, to form the first character, followed by the activation of the dots of strip 144, to complete the character letters, so that a complete row of characters can be formed without segmentation.

In FIG. 9, there is shown a flat, belt-type copying machine, having a photosensitive endless belt 58 supported between two rollers 50 and 52, pivotable on axles 51 and 53. Photosensitive belt 58 is designed to move across a platen 54, consisting of a planar rigid material. Rollers 56 and 57 maintain the belt in a flat plane across the surface of platen 54, so that an LCD strip 55, having one or more rows of LCD conductive dots 59 with corresponding light pipes can be disposed over the photosensitive flat belt. In a manner similar to the operation of cylindrical drum 18, direct images of the characters can be transmitted onto the surface of photosensitive belt 58.

FIG. 10 is a full screen LCD panel 60, preferably having rows and columns of 5×7 dot matrices 61, for forming images such as alphanumeric characters on the entire screen. The screen is constructed with a corresponding light pipes element sandwiched to the LCD element, and the individual pipes are aligned over each of the columns and rows of etched LC conductive dots.

It is thus possible to illuminate the full screen panel 60 of FIG. 10, and provide imaging onto planar photosensitive material, such as polaroid film or photo negative film.

Full screen 60, having dot matrices 61, may also be used for forming images onto flat, belt-type reproduction devices, such as that shown in FIG. 9, so that visual displays of exceptional quality can be provided. The panel can also be used for providing visual displays by backlighting panel 60 with colored lights. The display can also be used for keyboards and computer read-outs, where a full screen display may be required. The opaque glass of the light pipe panels will provide a high contrast image for those LC dots which are activated and made clear, so that sharp images of light will be transmitted through the transparent pipes of full screen 60.

FIG. 11 is an exploded view of the optics of the LC-light pipe screen, illustrating protective plane glass 40, covering polarizer 41 which is later sandwiched to a clear glass 42. Glass 42 has one surface with electroconductive etching, the row of dots which being aligned to correspond with the light pipe valves in the light pipe glass 43. Glass 43 also has corresponding conductive dots covering each of the light pipes. An additional polarizer 44, having a polarization perpendicular to polarizer 41, covers the opposite side of light pipe glass 43.

The light pipes have been produced by Corning Glass under their Trademark, Fotoform Process, using photosensitive glass. It was discovered that the glass portions which are exposed to ultraviolet light become opaque, and the unexposed portions remain clear. By selectively exposing the photosensitive glass through a photographic mask, it has been found possible to form transparent light pipes through the entire thickness of the glass. The glass is then polished to have an optically flat surface for use in the liquid crystal element. It is desirable to use light pipes about 0.020" in diameter, similar to the diameter of the conductive regions for the liquid crystal, and separated from each other by 0.001-0.002". The glass should have a thickness sufficient to give it rigidity for use in the liquid crystal element, and to create a sufficiently long tunnel path so that the light will be directional toward the photosensitive surface. A light pipe having a thickness of ⅛th of an inch would have pipes about six times longer than their diameter. The valves in the light pipe structure serve to isolate the light pipes from the rear light source.

The electronic circuitry for producing alphanumeric images on the dot matrix of FIG. 10, or along a single row of dots such as in FIGS. 3 or 4, is conventional and readily available, as explained in FIG. 2 of applicant's earlier U.S. Pat. No. 4,110,794, issued on Aug. 28, 1978, or FIG. 5 of U.S. application Ser. No. 794,787, filed on May 9, 1977.

The liquid crystal dots or matrices can be operated in several different ways. A drive voltage can be provided to drive the liquid crystal to produce an opaque area on the screen. There are a number of different ways to multiplex the segment displays or dots. One of the preferred ways is by placing the decoder circuitry on the screen itself or on the liquid crystal dot, so that a minimum number of contacts would be required to the liquid crystal strip, in order to operate the display. All displays, such as liquid crystals, must be constantly refreshed in order to retain the image. The memory time is approximately 200 milliseconds on some of the crystals, but it can vary. Typically, the individual liquid crystal dots, which form a portion of any alphanumeric character, are approximately 1/50 of an inch in diameter, and are separated from each other by several thousandths of an inch. In printing alphanumeric characters, it is sometimes possible to eliminate the space between the dots when the printing occurs, by printing the dot rather darkly under high contrast conditions, so that the adjacent dot, when reproduced on the photosensitive screen, will "bleed together", covering over the segmentation.

The basic LCD cell has no readily discernible optical characteristics and looks transparent. If a properly oriented piece of linear polarizer is placed on each glass surface, the basis of the cell's display properties is provided. The top filter lets in light with a particular orientation; the LC material shifts this light 90 degrees, and if the bottom filter is skewed 90 degrees with respect to the top filter, this twisted light is in phase with the bottom filter and thus passes freely through the cell, which thus still looks perfectly transparent.

When a voltage is applied to electrodes placed across such a cell, the LC material's molecules line up between the electrodes. Because of the material's purity, only a small leakage current (20nA) keep them positioned this way. Positioned on the LCD sandwich, these energized electrodes disrupt the spiral staircase. Light passing through the sandwich is now improperly oriented with respect to the bottom polarizing filter; the bottom polarizer absorbs the light in the regions between the electrodes. The resulting dark-on-light display provides legibility over wide angles in a wide range of ambient light conditions. In effect, energizing the electrodes with a microwatt or so of power is equivalent to turning portions of the polarizing filters 90 degrees with respect to each other.

Another advantage of the present invention is that the size and style of type can be changed by changing the memory of the microprocessor. For example, in a short business letter, the lettering can be increased in size and separation. In the microprocessor can be stored the binary information relating to the style of type, such as Gothic or Roman style, so that the depressing of a particular key 15 on the keyboard can set the particular style, and another key can set the size of the lettering, before the letter is printed.

With the use of bubble memory systems, it will also be possible to store large numbers of pages of written information, such as a multi-page report, which can later be recalled at any time, and rapidly reprinted sequentially.

While several embodiments of the present invention have been shown and described, it will be obvious to those persons of ordinary skill in the art, that many changes and modifications may be made thereunto, without departing from the spirit and scope of the invention.

What is claimed is:

1. A liquid crystal display comprising:
   a non-conductive, transparent first sheet and a non-conductive substantially opaque second sheet each having substantially planar inner and outer surfaces, said non-conductive sheets being disposed adjacent to one another with their inner surfaces opposing one another in spaced-apart relationship separated by a sealed-in, normally transparent, liquid crystal material, said non-conductive sheets each having a transparent conductive electrical coating disposed on said inner surface thereof with at least said conductive coating of said second non-conductive sheet comprising a plurality of discrete character forming segments having means connected thereto for electrically coupling said segments to an external power source, said second non conductive sheet having a plurality of discrete transparent light pipes formed therethrough, each of which is aligned with one of said character-forming segments; and first and second linear polarizer sheets, said first polarizer sheet being secured to the outer surface of said first non-conductive sheet and said second polarizer sheet being secured to the outer surface of said second non-conductive sheet.

2. The liquid crystal display according to claim 1 wherein said first and second non-conductive sheets each comprise a glass sheet.

3. The liquid crystal display according to claim 1 wherein said character forming segments are arranged in a single row.

4. The liquid crystal display according to claim 3 wherein said character forming segments are separated by about 0.001".

5. The liquid crystal display according to claim 1 wherein said character forming segments and said discrete transparent channels each have a similar configuration.

6. The liquid crystal display according to claim 3 wherein said character forming segments are square-shaped and said transparent light pipes have a corresponding square-shaped cross-section.

7. The liquid crystal display according to claim 1 wherein each of said character forming segments completely overlie their correspondingly aligned light pipes.

8. The liquid crystal display according to claim 1 wherein said conductive coating on said first sheet is separated into a plurality of discrete character forming segments, each of which is in registry with one of said character forming segments of said second sheet.

9. The liquid crystal display according to claim 1 wherein said plurality of character forming segments are arranged in at least two staggered rows, with the segments of each row being laterally offset with respect to the segments of the other row.

10. The liquid crystal display according to claim 1 wherein said plurality of character forming segments are arranged in matrices which, in turn, are arranged in a plurality of columns and rows.

11. The liquid crystal display according to claim 1 wherein said first and second polarizer sheets are linearly polarized with the direction of linear polarization of said first sheet being disposed normally with respect to the direction of linear polarity of said second sheet.

12. The liquid crystal display according to claim 1 wherein said means for electrically coupling comprises leads extending from said character forming segments to an edge of said second non-conductive sheet.

13. The liquid crystal display according to claim 1 wherein said segments and said channels are about 0.020" in diameter.

14. A method for producing a liquid crystal display, the steps comprising:

applying a transparent conductive coating to the inner surface to a transparent, non-conductive, first sheet and to a substantially opaque, non-conductive second sheet, the latter of which has a plurality of discrete transparent channels formed therethrough, said coating being applied to said second sheet so as to separate said coating into discrete character forming segments, each of which overlie one of said transparent channels;

securing to said coatings on each of said sheets, means for electrically coupling said coatings to an external power source;

sealing a normally transparent liquid crystal material between said inner surfaces of said non-conductive sheets; and securing a linear polarizer sheet to the outer surface of each of said non-conductive sheets.

15. The method according to claim 14 wherein said discrete character-forming segments are formed by etching.

16. The method according to claim 15 wherein said first and second sheets are glass.

17. A liquid crystal light pipe display for reproducing alphanumeric characters on the photosensitive surface of a photocopy machine from data provided by an external information source, comprising:

a non-conductive, transparent first sheet and a non-conductive substantially opaque second sheet each having substantially planar inner and outer surfaces, said non-conductive sheets being disposed adjacent to one another with their inner surfaces opposing one another in spaced-apart relationship separated by a sealed-in, normally transparent, liquid crystal material, said non-conductive sheets each having a transparent conductive electrical coating disposed on said inner surface thereof with at least said conductive coating of said second non-conductive sheet comprising a plurality of discrete character forming segments having means connected thereto for electrically coupling said segments to the external information source, said second non-conductive sheet having a plurality of discrete transparent light pipes formed therethrough, each of which is aligned with one of said character-forming segments; and first and second linear polarizer sheets, said first polarizer sheet being secured to the outer surface of said first non-conductive sheet and said second polarizer sheet being secured to the outer surface of said second non-conductive sheet, said light pipes being disposed transversely to the movement of the photosensitive surface of the photocopy machine, wherein said second opaque sheet is disposed adjacent to the photoconductive surface, so that the transparent light pipes are substantially directly coupled to the surface, and the characters imaged by the light pipes onto the surface are formed substantially without blooming.

18. The display as recited in claim 17 wherein the photoconductive surface is a cylindrical drum having an axis for rotational movement.

19. The liquid crystal display according to claim 18 wherein the character forming segments and corresponding light pipes are arranged in a single row, parallel to the rotational axis of the drum.

20. The liquid crystal display according to claim 18 comprising a further liquid crystal light pipe display mounted adjacent to said original display and parallel to the rotational axis of the drum, the character forming row of segments of the original and further displays being staggered, the segments of each row being laterally offset with respect to the segments of the other row by the width of each segment, so that images with segmentation can be produced onto the surface of the drum.

21. A light pipe display for reproducing alphanumeric characters from an external information source onto the photosensitive drum surface of a photocopy machine, comprising:

at least one elongated display strip, having a single line of character forming segments and light pipes, wherein each segment covers an individual light pipe, said light pipes being dispersed adjacent to the photosensitive surface of the drum so that the light pipes are substantially directly coupled to the drum surface to produce characters substantially without blooming when the display strip is illuminated by an external light source, said strip being disposed transversely to the scanning direction of the photocopy machine, said strip being coupled to the external information source for addressing the proper column of segments in a row to produce the top portion of a complete line of alphanumeric characters on said screen, addressing the same segments in the next sequential row, so that the top portion of the characters are shifted one space up to display the adjacent lower portion of the character line on said display, so that after a plurality of addressing cycles, the stored alphanumeric indicia are converted to a line of segments and reproduced on said display, and are scrolled synchronously in the same direction and at the same speed as the speed of rotation of drum of the photocopy machine.

* * * * *